US 6,673,872 B2

(12) United States Patent
van Beek et al.

(10) Patent No.: US 6,673,872 B2
(45) Date of Patent: Jan. 6, 2004

(54) HIGH PERFORMANCE THERMOPLASTIC COMPOSITIONS WITH IMPROVED MELT FLOW PROPERTIES

(75) Inventors: Franciscus Johannes Maria van Beek, Zundert (NL); Glen D. Merfeld, Menands, NY (US); Alan Oshinski, Mt. Vernon, IN (US); Robert Puyenbroek, Bergen op Zoomk (NL); Kenneth Paul Zarnoch, Scotia, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/572,119

(22) Filed: May 17, 2000

(65) Prior Publication Data

US 2003/0125478 A1 Jul. 3, 2003

(51) Int. Cl.⁷ .................. C08L 79/08; C08L 81/06; C08L 71/02
(52) U.S. Cl. .................. 525/397; 525/390; 525/436
(58) Field of Search ................ 525/397, 436, 525/390

(56) References Cited

U.S. PATENT DOCUMENTS

| | | | |
|---|---|---|---|
| 3,257,357 A | 6/1966 | Stamatoff | |
| 3,257,358 A | 6/1966 | Stamatoff | |
| 3,306,874 A | 2/1967 | Hay | |
| 3,306,875 A | 2/1967 | Hay | |
| 3,642,946 A | 2/1972 | Grabowski | |
| 3,803,085 A | 4/1974 | Takehoshi et al. | |
| 3,814,869 A | 6/1974 | De Luca | |
| 3,847,867 A | 11/1974 | Health et al. | |
| 3,850,885 A | 11/1974 | Scotia et al. | |
| 3,852,242 A | 12/1974 | White | |
| 3,855,178 A | 12/1974 | White et al. | |
| 3,905,942 A | 9/1975 | Takekoshi et al. | |
| 3,914,266 A | 10/1975 | Hay | |
| 3,972,902 A | 8/1976 | Heath et al. | |
| 3,983,093 A | 9/1976 | Williams, III et al. | |
| 4,028,341 A | 6/1977 | Hay | |
| 4,042,551 A | 8/1977 | Kruse | |
| 4,076,929 A | 2/1978 | Dohany | |
| 4,080,403 A | 3/1978 | Gergen et al. | |
| 4,135,009 A | 1/1979 | Mercurio | 427/195 |
| 4,151,151 A | 4/1979 | Isley | |
| 4,293,670 A | 10/1981 | Robeson et al. | 525/436 |
| 4,385,146 A | 5/1983 | Axelrod | 524/139 |
| 4,431,779 A | 2/1984 | White et al. | 525/397 |
| 4,443,591 A | 4/1984 | Schmidt et al. | 528/128 |
| 4,455,410 A | 6/1984 | Giles, Jr. | 525/436 |
| 4,481,325 A | 11/1984 | Giles, Jr. | 524/320 |
| 4,515,921 A | 5/1985 | Witman | 525/67 |
| 4,515,924 A | 5/1985 | Brooks et al. | 525/432 |
| 4,588,806 A | 5/1986 | Aycock et al. | 528/215 |
| 4,663,378 A | 5/1987 | Allen | 524/267 |
| 4,692,482 A | 9/1987 | Lohrengel | 523/340 |
| 4,737,546 A | 4/1988 | Liu et al. | 525/148 |
| 4,778,855 A | 10/1988 | Boutni et al. | 525/146 |
| 4,806,297 A | 2/1989 | Brown et al. | 264/102 |
| 4,806,602 A | 2/1989 | White et al. | 525/397 |
| 4,822,830 A | 4/1989 | Adkins | 523/203 |
| 4,935,472 A | 6/1990 | Brown et al. | 525/394 |
| 4,942,206 A | 7/1990 | White et al. | 525/397 |
| 4,981,890 A | 1/1991 | Schleifstein | 524/169 |
| 5,081,185 A | 1/1992 | Haaf et al. | 525/68 |
| 5,095,060 A | 3/1992 | Haaf | 524/293 |
| 5,204,410 A | 4/1993 | Banevicius et al. | 525/132 |
| 5,256,250 A | 10/1993 | Pelzer | 159/6.3 |
| 5,272,248 A | 12/1993 | Pratt et al. | 528/353 |
| 5,376,714 A | 12/1994 | Yates | 524/130 |
| 5,376,724 A | 12/1994 | Bailly et al. | 525/132 |
| 5,419,810 A | 5/1995 | Van Der Piepen et al. | 159/6.2 |
| 6,166,137 A | 12/2000 | Brown et al. | 525/133 |
| 6,211,327 B1 * | 4/2001 | Braat et al. | 528/217 |

FOREIGN PATENT DOCUMENTS

| | | |
|---|---|---|
| EP | 0049191 | 9/1981 |
| EP | 0823457 | 8/1997 |

OTHER PUBLICATIONS

McKenna, L.A., *Modern Plastics Encyclopedia* "Sulfone Polymers" pp. 108, 110–112, (1977–78).

*Handbook of Plastics and Elastomers,* C.A. Harper, ed., McGraw–Hill, Inc., (1975) pp. 1–69, 1–95 to 96.

* cited by examiner

Primary Examiner—Ana Woodward

(57) ABSTRACT

A high performance thermoplastic polymer composition having improved melt flow properties, comprising a thermoplastic polymer resin and a low intrinsic viscosity poly (arylene ether). Preferred thermoplastic polymers are poly (imide) polymers.

35 Claims, No Drawings

HIGH PERFORMANCE THERMOPLASTIC COMPOSITIONS WITH IMPROVED MELT FLOW PROPERTIES

BACKGROUND OF THE INVENTION

High performance thermoplastic polymers such as poly(etherimide)s have been used to fabricate parts for numerous applications. Each application requires particular tensile and flexural properties, impact strength, heat distortion temperature (HDT), and resistance to warp. For example, U.S. Pat. No. 4,455,410 provides a poly(etherimide)-poly(phenylene sulfide) blend having good flexural strength characteristics. U.S. Pat. No. 3,983,093 provides poly(etherimide) compositions that have improved solvent resistance and are suitable for use in preparing films, molding compounds, coatings, and the like.

These thermoplastic polymers are characterized by a high glass transition temperature, usually above about 180° C., which makes them suitable for use in applications that require exposure to high temperatures. A drawback of these materials is that they exhibit poor melt flow properties, which makes processing difficult. Injection molding of thermoplastic polymers, for instance, is more easily performed with a thermoplastic resin that has a higher melt volume rate (MVR). Good melt flow properties are necessary to achieve fast molding cycles and to permit molding of complex parts. At the same time, mechanical properties such as impact strength and ductility must be maintained in order to pass product specifications.

U.S. Pat. No. 4,431,779 to White et al. discloses blends of polyetherimide and polyphenylene ether which exhibit good impact strength as well as good mechanical properties. White et al. focus on the comparability of polyphenylene ethers with polyetherimide, teaching that homogenous blends and non-uniform products may result. However, if amorphous polymers are employed, they are compatible and transparent films may be cast. The compatibility of the polyphenylene ethers to polyetherimide lessens as the quantity of aliphatic groups in the polymer increases. Although White et al. discuss polypheneylene ether polymers, they fail to teach the effects of such polymers and polymer blends on melt flow characteristics.

There accordingly remains a need in the art for thermoplastic polymers with improved melt flow properties, without the consequent loss of other desirable characteristics in the finished product.

BRIEF SUMMARY OF THE INVENTION

The above-described needs are met by a high performance, thermoplastic polymer composition having improved melt flow properties, comprising a high Tg, thermoplastic polymer resin and a poly(arylene ether) having a low intrinsic viscosity, preferably less than about 0.25 deciliters per gram (dl/g). Addition of low intrinsic viscosity poly(arylene ether)s generally have no or minimal detrimental effects on other physical properties of the thermoplastic polymer compositions.

DETAILED DESCRIPTION OF THE INVENTION

Addition of a poly(arylene ether) having a low intrinsic viscosity (IV) to high performance, high Tg, amorphous thermoplastic polymers provides highly improved melt flow properties to such polymers, without causing degradation of important mechanical properties such as impact strength and ductility. Other optional additives may also be used in the compositions to obtain other desired polymer properties.

Suitable high performance, high Tg thermoplastic polymer resins are known in the art, and typically have glass transition temperatures (Tg) of about 170° C. or greater, with about 200° C. or greater preferred. Exemplary resins include poly(imide), poly(sulfone), poly(ether sulfone), and other polymers.

Useful thermoplastic poly(imide) resins have the general formula (I):

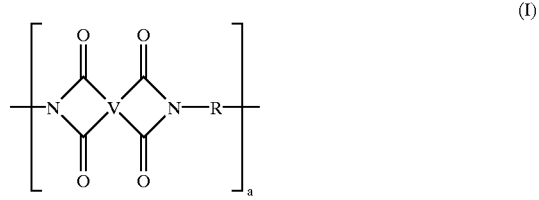

wherein a is more than 1, typically about 10 to about 1,000 or more, and more preferably about 10 to about 500; and V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations comprising at least one of the foregoing. Suitable substitutions and/or linkers include, but are not limited to, ethers, epoxides, amides, esters, and combinations comprising at least one of the foregoing. Preferred linkers include but are not limited to tetravalent aromatic radicals of formula (II), such as:

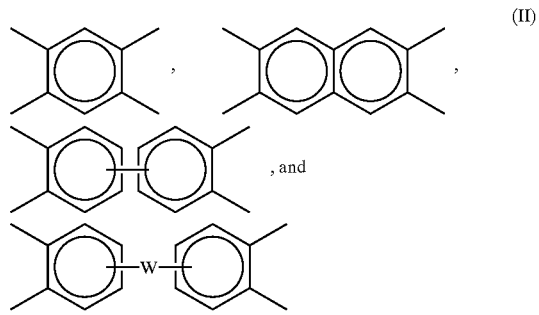

wherein W is a divalent moiety selected from the group consisting of —O—, —S—, —C(O)—, —SO$_2$—, C$_y$H$_{2y}$—, C$_y$H$_{2y-2}$— (y being an integer from 1 to 10), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III):

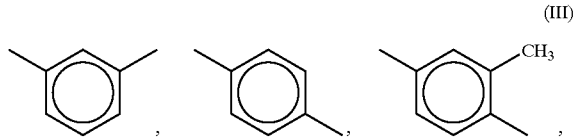

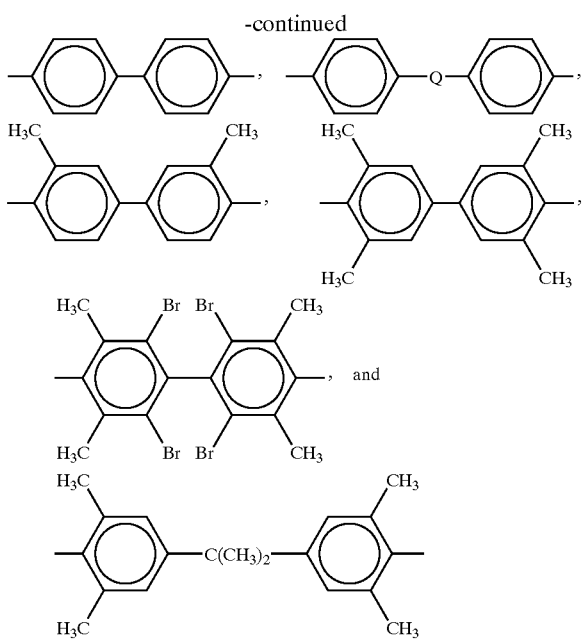

R in formula (I) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (IV):

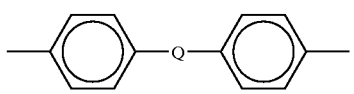
(IV)

wherein Q includes but is not limited to a divalent moiety selected from the group consisting of —O—, —S—, —C(O) —, —SO$_2$—, $C_yH_{2y}$—, $C_yH_{2y-2}$— (y being an integer from 1 to 10), and halogenated derivatives thereof, including perfluoroalkylene groups.

Preferred classes of poly(imide) polymers include poly (amide imide) polymers and poly(etherimide) polymers, particularly those poly(etherimide) polymers known in the art which are melt processable, such as those whose preparation and properties are described in U.S. Pat. Nos. 3,803,085 and 3,905,942, each of which is incorporated herein by reference.

Preferred poly(etherimide) resins comprise more than 1, typically about 10 to about 1000 or more, and more preferably about 10 to about 500 structural units, of the formula (V):

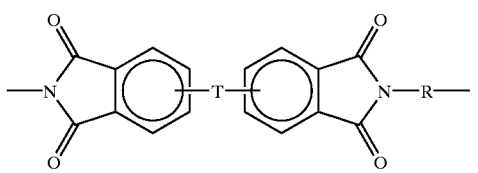
(V)

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited, to divalent radicals of formula (III) as defined above.

In one embodiment, the poly(etherimide) may be a copolymer which, in addition to the etherimide units described above, further contains poly(imide) structural units of the formula (VI):

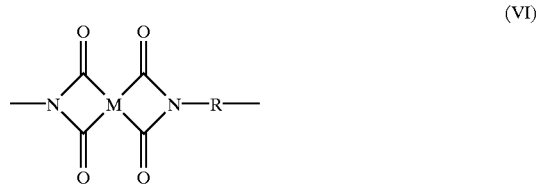
(VI)

wherein R is as previously defined for formula (I) and M includes, but is not limited to, radicals of formula (VII):

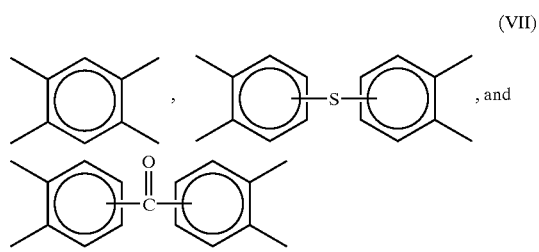
(VII)

The poly(etherimide) can be prepared by any of the methods known to those skilled in the art, including the reaction of an aromatic bis(ether anhydride) of the formula (VIII):

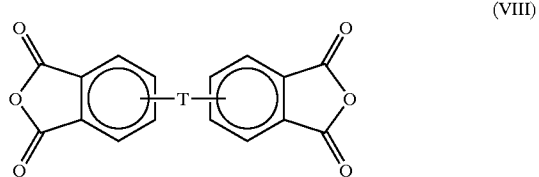
(VIII)

with an organic diamine of the formula (IX):

(IX)

wherein T and R are defined as described above in formulas (I) and (IV).

Examples of specific aromatic bis(ether anhydride)s and organic diamines are disclosed, for example, in U.S. Pat. Nos. 3,972,902 and 4,455,410, which are incorporated herein by reference. Illustrative examples of aromatic bis (ether anhydride)s of formula (VIII) include: 2,2-bis[4-(3, 4-dicarboxyphenoxy)phenyl]propane dianhydride (i.e., the dianhydride of bisphenol-A); 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis [4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2, 3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures comprising at least one of the foregoing aromatic bis(ether anhydride)s.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by formula (VIII) above includes, but is not limited to, compounds wherein T is of the formula (X):

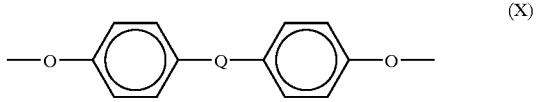
(X)

and the ether linkages, for example, are preferably in the 3,3', 3,4', 4,3', or 4,4' positions, and mixtures comprising at least one of the foregoing linkages, and where Q is as defined above.

Many diamino compound may be employed. Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl)sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl)toluene, bis(p-b-amino-t-butylphenyl) ether, bis(p-b-methyl-o-aminophenyl)benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether, and 1,3-bis(3-aminopropyl) tetramethyldisiloxane. Mixtures comprising at least one of these compounds may also be present. The preferred diamino compounds are aromatic diamines, especially m- and p-phenylenediamine, hexamethylenediamnine, aliphatic diamines, and mixtures comprising at least one of the foregoing diamines.

In a particularly preferred embodiment, the poly (etherimide) resin comprises structural units according to formula (V) wherein each R is independently p-phenylene or m-phenylene or a mixture comprising at least one of the foregoing Rs, and T is a divalent radical of the formula (XI):

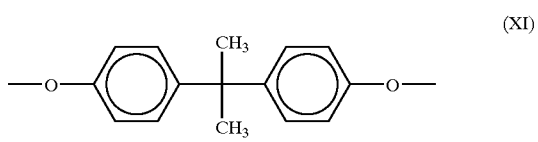
(XI)

Included among the many methods of making the poly (imide)s, particularly poly(etherimide) polymers, are those disclosed in U.S. Pat. Nos. 3,847,867, 3,814,869, 3,850,885, 3,852,242, 3,855,178, 3,983,093, and 4,443,591. These patents are incorporated herein by reference for the purpose of teaching, by way of illustration, general and specific methods for preparing polyimides.

In general, the reactions can be carried out employing well-known solvents, e.g., o-dichlorobenzene, m-cresol/toluene and the like, to effect a reaction between the anhydride of formula (VIII) and the diamine of formula (IX), at temperatures of about 100° C. to about 250° C. Alternatively, the poly(etherimide) can be prepared by melt polymerization of aromatic bis(ether anhydride)s (VIII) and diamines (IX) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/polyimide copolymers are employed, a dianhydride, such as pyromellitic dianhydride, is used in combination with the bis(ether anhydride). The poly(etherimide) resins can optionally be prepared from reaction of an aromatic bis (ether anhydride) with an organic diamine in which the diamine is present in the reaction mixture at no more than about 0.2 molar excess, and preferably less than about 0.2 molar excess. Under such conditions the poly(etherimide) resin has less than about 15 microequivalents per gram ($\mu$eq/g) acid titratable groups, and preferably less than about 10 $\mu$eq/g acid titratable groups, as shown by titration with chloroform solution with a solution of 33 weight percent (wt %) hydrobromic acid in glacial acetic acid. Acid-titratable groups are essentially due to amine end-groups in the poly(etherimide) resin.

Generally, useful poly(etherimide) resins have a melt flow rate of about 1.0 to about 200 grams per ten minutes ("g/10 min"), as measured by American Society for Testing Materials ("ASTM") D1238 at 337° C., using a 6.6 kilogram ("kg") weight. In a preferred embodiment, the polyetherimide resin has a weight average molecular weight (Mw) of about 10,000 to about 150,000 grams per mole ("g/mole"), as measured by gel permeation chromatography, using a polystyrene standard. Such polyetherimide resins typically have an intrinsic viscosity greater than about 0.2 deciliters per gram ("dl/g"), preferably about 0.35 to about 0.7 dl/g measured in m-cresol at 25° C. Some such polyetherimides include, but are not limited to ULTEM® 1000 (number average molecular weight (Mn) 21,000; weight average molecular weight (Mw) 54,000; dispersity 2.5), ULTEM® 1010 (Mn 19,000; Mw 47,000; dispersity 2.5), ULTEM® 1040 (Mn 12,000; Mw 34,000–35,000; dispersity 2.9), or mixtures comprising at least one of the foregoing polyetherimides.

Poly(sulfone) polymers are derivatives of polysulfides and have more than one, typically more than 10 repeating units of the formula —Ar—SO$_2$—. Preferred resins polysulfones are amorphous resins with high resistivity and dielectric strength. Polysulfones have high resistance to thermo oxidative conditions, and hydrolytic stability, making them suitable for appliances, electronic components, aircraft interior parts, and biological and medical devices.

The term "sulfone polymer", as used herein, is intended to encompass those sulfone polymers featuring the sulfone group. Such materials are well known and are described in a number of places including, but not limited to: U.S. Pat. No. 4,080,403, U.S. Pat. No. 3,642,946; Modern Plastics Encyclopedia, 1977–78, pp. 108, 110–11 and 112; Kirk-Othmer Encyclopedia of Chemical Technology, Second Edition, Vol. 16, pp. 272–281 (1968); and Handbook of Plastics and Elastomers, C. A. Harper, ed., McGraw-Hill, Inc., 1975 pp. 1–69 and 1–95 to 96; all of which are incorporated herein by reference. Representative polymers of this type include poly(sulfone), poly(ether sulfone), poly(phenyl sulfone) and the like, as well as mixtures comprising at least one of the foregoing poly(sulfone)s. Commercially available sulfone polymers include those sold under the following trademarks: UDEL, RADEL A, RADEL R (commercially available from BP Amoco) and VICTREX (commercially available from ICI Americas, Inc.).

Suitable poly(arylene ether) polymers are those having low intrinsic viscosities. Poly(arylene ether) polymers are known, comprising a plurality of structural units of the formula (XII):

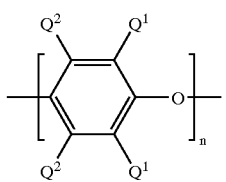

(XII)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen. Meanwhile, n is less than 50, with less than about 40 preferred, and about 10 to about 25 especially preferred.

Both homopolymer and copolymer poly(arylene ether) resins may be used. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether)-containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Combinations of any of the above may also be used.

The poly(arylene ether) generally has a number average molecular weight of less than 6,000, with about 1,200 to about 4,800 preferred, and about 1,200 to about 3,000 especially preferred, as determined by gel permeation chromatography. Effective improvement in melt flow properties is generally achieved by use of poly(arylene ether) resins wherein the intrinsic viscosity (IV) of the resin is below 0.30 deciliters per gram (dl/g), preferably up to 10 about 0.25 dl/g, more preferably up to about 0.20 dl/g, and most preferably about 0.10 to about 0.15 dl/g (all measured in chloroform at 25° C.).

The poly(arylene ether) ether polymers suitable for use in this invention may be prepared by any number of processes known in the art from corresponding phenols or reactive derivatives thereof. Poly(arylene ether) resins are typically prepared by the oxidative coupling of at least one monohydroxy aromatic compound such as 2,6-xylenol or 2,3,6-trimethylphenol. Catalysts systems are generally employed for such coupling and contain at least one heavy metal compound such as copper, manganese, or cobalt compounds, usually in combination with various other materials. Catalyst systems containing a copper compound are usually combinations of cuprous or cupric ions, halide (e.g., chloride, bromide, or iodide) ions and at least one amine such as cuprous chloride-trimethylamine. Catalyst systems which contain manganese compounds are generally alkaline systems in which divalent manganese is combined with such anions as halide, alkoxide or phenoxide. Most often, the manganese is present as a complex with one or more complexing and/or chelating agents such as dialkylamines, alkylenediamines, o-hydroxy aromatic aldehydes, o-hydroxyazo compounds and o-hydroxyaryl oximes. Examples of manganese containing catalysts include manganese chloride-and manganese chloride-sodium methylate. Suitable cobalt type catalyst systems contain cobalt salts and an amine.

Examples of catalyst systems and methods for preparing poly(arylene ether) resins are set forth in U.S. Pat. Nos. 3,306,874, 3,306,875, 3,914,266 and 4,028,341 (Hay), 3,257,357 and 3,257,358 (Stamatoff), 4,935,472 and 4,806,297 (S. B. Brown et al.) and 4,806,602 (White et al.).

In general, the molecular weight of the poly(arylene ether) resins can be controlled by controlling the reaction time, the reaction temperature and the amount of catalyst. Long reaction times provide a higher average number of repeating units and a higher intrinsic viscosity. At some point, a desired molecular weight (intrinsic viscosity) is obtained and the reaction terminated by conventional means. For example, in the case of reaction systems which make use of a complex metal catalysts, the polymerization reaction may be terminated by adding an acid, e.g., hydrochloric acid, sulfuric acid and the like or a base e.g., potassium hydroxide and the like and the product is separated from the catalyst by filtration, precipitation or other suitable means as taught by Hay in U.S. Pat. No. 3,306,875. The ultra low intrinsic viscosity poly(arylene ether) resin may be recovered from the reaction solution used in the synthesis of higher molecular weight resins after the higher molecular weight resins have been separated.

It is preferable to employ ultra low IV poly(arylene ether) resin that is not recovered from a reaction solution by precipitation in a non-solvent. The solids recovered by these techniques are too fine and light, i.e. have an unacceptably low bulk density, to properly feed into processing equipment. It is preferable to employ ultra low LV poly(arylene ether) resin that is recovered from the reaction solution as a solid mass or in the form of an agglomerate having a size of at least 100 μm; preferably of a size greater than 1 mm. Agglomerates can be formed by spray drying the reaction solution. The ultra low IV poly(arylene ether) resin can be recovered as a solid mass in conventional equipment where the solvent is stripped off at elevated temperatures. This can be accomplished in conventional vented extruders, or vacuum/vented extruders, as such described in U.S. Pat. No. 5,204,410, or film evaporators, such as described in U.S. Pat.

Nos. 5,419,810 and 5,256,250. The reaction solution may be concentrated as described in U.S. Pat. No. 4,692,482 to facilitate the removal of solvent performed by this equipment and minimize the exposure of the ultra low viscosity poly(arylene ether) resin to thermal stress. Forming a solid mass enables the ultra low viscosity poly(arylene ether) to be pelletized to a conventional pellet size of about 3 millimeters (mm) or any desired size. The ultra low LV poly (arylene ether) is preferably of a conventional pellet size so that it can be easily handled in feed hoppers for the equipment used to form the poly(arylene ether) blend with the high Tg amorphous thermoplastic polymer resin, and optionally additives. Preferably, this is accomplished with minimal thermal stress so that the formation of impurities is not a problem, as is taught in U.S. patent application Ser. No. 09/547,648, which is incorporated herein by reference.

Particularly useful poly(arylene ether) polymers are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90 wt % of the polymer, may contain at least one of the aminoalkyl-containing and 4-hydroxybiphenyl end groups.

The high performance, thermoplastic polymer compositions having improved melt flow properties may optionally comprise various other additives known in the art. Exemplary additives include antioxidants, for example organophosphites such as tris(nonyl-phenyl)phosphite, tris(2,4-di-t-butylphenyl)phosphite, bis(2,4-di-t-butylphenyl) pentaerythritol diphosphite and distearyl pentaerythritol diphosphite; alkylated monophenols, polyphenols and alkylated reaction products of polyphenols with dienes, such as tetrakis{methylene(3,5-di-tert-butyl-4-hydroxyhydrocinnamate)}methane and octadecyl 3,5-di-tert-butyl-4-hydroxyhydrocinnamate; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, distearylthiopropionate, dilaurylthiopropionate, and ditridecylthiodipropionate; and amides of beta-(3,5-di-tert-butyl-4-hydroxyphenyl)-propionic acid.

Additives, i.e. fillers and reinforcing agents, are also known, such as, for example, conductive materials (such as metal flakes, metal particles, metal fibers, metal coated glass flakes, metal coated micas, carbon fibers, metal coated micas, carbon fibers, carbon nanotubes, metal coated fibers, and the like), silicates, titanium dioxide, ceramics, glass in the form of continuous glass fibers, spheres, particles, flaked glass, milled glass, fiber glass (especially chopped fiber glass), and mixtures comprising at least one of the foregoing glasses, carbon black, graphite, calcium carbonate, talc, and mica, and mixtures comprising at least one of the foregoing fillers and reinforcing agents. Other additives include mold release agents, compatibilizers, UV absorbers, anti-drip agents, stabilizers such as light stabilizers and others, lubricants, plasticizers, pigments, dyes, colorants, anti-static agents, blowing agents, flame retardants, impact modifiers, crystallization nucleators, and the like, as well as mixtures comprising at least one of the foregoing additives.

In the present high performance, thermoplastic polymer compositions, the high Tg amorphous thermoplastic resin component may be present in an amount of about 40 wt % to about 99.9 weight percent (wt %) of the total composition, with about 50 wt % to about 99 wt % preferred, and about 70 wt % to about 95 wt % especially preferred, with the remainder comprising a quantity of the low intrinsic viscosity poly(arylene ether). The effective quantity of low intrinsic viscosity poly(arylene ether) will vary depending on the properties of the high Tg thermoplastic resin component and any additional components (if present), and is readily determined by one of ordinary skill in the art. Such quantities will generally be in up to about 50 wt % based on the total composition, with about 0.1 to about 50 wt % preferred, about 1 to about 40 wt % more preferred, with about 5 wt % to about 30 wt % especially preferred. The thermoplastic polymer composition can further comprise about 0.1 wt % to about 50 wt % additives (e.g., fillers, reinforcing agents, etc.), with about 5 wt % to about 40 wt % preferred, and about 15 wt % to about 30 wt % especially preferred.

The preparation of the high performance, thermoplastic polymer compositions is normally achieved by merely blending the components under conditions suitable for the formation of an intimate blend. Such conditions may include solution blending or melt mixing in single or twin screw type extruders, mixing bowl, roll, kneader, or similar mixing devices that can apply a shear to the components. Twin screw extruders are often preferred due to their more intensive mixing capability over single screw extruders. It is often advantageous to apply a vacuum to the blend through at least one vent port in the extruder to remove volatile components in the composition.

Meanwhile, the blend is preferably sufficiently heated such that the components are in the molten phase, thereby enabling intimate mixing. Typically, temperatures up to about 350° C. can be employed, with about 250° C. to about 350° C. preferred.

The blended, high performance, thermoplastic polymer compositions can be molded into useful articles, such as, for example, heat resistant containers, by a variety of means such as, for example, injection molding, compression molding, thermoforming, and blow molding, among others conventionally known in the art. All patents cited are incorporated herein by reference.

The invention will be further described by the following examples, which are meant to be illustrative, not limiting.

EXAMPLES

TABLE 1: Control 1 and Examples 1 and 2; Control 2 and Examples 3–5

All formulations were compounded in a 25 millimeter (mm) Werner & Pfleiderer co-rotating twin screw extruder operating at a temperature of 360° C., and a speed of 300 rpm. The extrudate was quenched in a water bath and pelletized.

The pellets were dried for a minimum of 4 hours at 135° C. then injection molded into various test specimens using a 130 ton Stork injection molding machine with a melt temperature of 360° C. and a mold temperature of 140° C. The physical and mechanical properties of these formulations are reported in Table 1. Details of the test procedures are described in the experimental section that follows.

For Control 1 and Examples 1 and 2, the formulations were prepared with 0, 1, and 4 parts, respectively, of low IV (0.12 dl/g) PPO® SA120 (poly(phenylene ether) commercially available from GE Plastics, Pittsfield, Mass.) in ULTEM®1000 (polyetherimide commercially available from GE Plastics, Pittsfield, Mass.). Examples 1 and 2, which contain the low IV PPO®, have significantly better melt flow than the Control 1 without any loss in either the tensile or impact properties. The melt flow increases with SA120 PPO® content.

The formulations for Control 2, and Examples 3–5 were prepared using a lower molecular weight polyetherimide resin, ULTEM® 1010, with 0, 1, 3 and 5 parts of low IV PPO® SA120, respectively. Once again, the flow improves with increasing levels of low IV PPO® resin without a loss in either the tensile or impact properties.

TABLE 1

|  | Control 1 | 1 | 2 | Control 2 | 3 | 4 | 5 |
|---|---|---|---|---|---|---|---|
| Component |  |  |  |  |  |  |  |
| ULTEM ® 1010 (wt %) |  |  |  | 100 | 99 | 97 | 95 |
| ULTEM ® 1000 (wt %) | 100 | 99 | 96 |  |  |  |  |
| PPO ® SA120 0.12 IV (wt %) |  | 1 | 4 |  | 1 | 3 | 5 |
| Properties |  |  |  |  |  |  |  |
| MVR, 360° C./5 kg (cc/10 min) | 20.4 | 21.7 | 27.6 | 40.4 | 40.2 | 46.3 | 51 |
| Plate-plate MV, 360° C. | 1152 | 903 | 563 | 697 | 609 | 539 | 493 |
| Tensile Modulus (MPa) | 3345 | 3271 | 3248 | 3334 | 3333 | 3329 | 3331 |
| Tensile Yield Stress (MPa) | 114 | 114 | 112 | 109 | 110 | 112 | 111 |
| Tensile Elongation (%) | 11 | 23 | 13 | 5 | 8 | 13 | 8 |
| Izod Notched Impact (kJ/m$^2$) | 4.8 | 5.2 | 4.9 | 4.8 | 4.9 | 4.7 | 5.1 |

TABLE 2: Control 3, Comparative Example 1, and Example 6

Two formulations were prepared with 30 parts of 0.48 IV PPO® (Comp. 1) or 0.12 IV PPO® SA120 (Example 6) in a polyetherimide resin of ULTEM® 1010. An unfilled polyetherimide resin was included as a control (Control 3). All formulations were compounded and molded into test specimens consistent with the procedures outlined in the examples from Table 1.

Test data in Table 2 indicates that the use of low IV PPO® in place of the 0.48 IV PPO® resulted in a significant improvement in flow. Although there is a decrease in the tensile and impact properties with the use of low IV PPO® at these high loadings, the properties are suitable for a variety of applications.

TABLE 2

|  | Units | Control 3 | Comp 1 | 6 |
|---|---|---|---|---|
| Component |  |  |  |  |
| ULTEM ® 1010 | wt % | 100 | 70 | 70 |
| PPO ® 803, 0.48 IV | wt % | — | 30 | — |
| PPO ® SA120, 0.12 IV | wt % | — | — | 30 |
| Properties |  |  |  |  |
| MVR, 295° C./10 kg | cc/10 min | 0.5 | 8 | 60 |
| Tensile Modulus | MPa | 3300 | 3000 | 3200 |
| Tensile Yield Stress | MPa | 116 | 93 | 46 |
| Tensile Elongation | % | 16 | 5 | 1 |
| Izod Unnotched Impact | kJ/m$^2$ | 60 | 51 | 8 |
| Vicat-B | ° C. | 213 | 209 | 196 |

TABLE 3: Control 4, Comparative Examples 2–4, and Examples 7–9

Polyetherimide formulations containing 20 parts of chopped glass fiber with 0, 3, 5, and 7 parts of either a 0.46 IV PPO® or 0.12 IV PPO® SA120 were dry blended and compounded in a 2.5 inch Egan single screw extruder operating at a temperature of 360° C. and 100 rpm. The glass fiber was fed in the feed throat. The extrudate was quenched in a water bath and pelletized.

The pellets were dried for a minimum of 4 hours at 140° C. before molding into various ASTM test specimens using a 150 ton Newbury injection molding machine at a melt temperature of 360° C. and a mold temperature of 140° C. The results of the various physical and mechanical properties are reported in Table 3. Details of the test procedures follow the tabulated data.

As determined by capillary rheometry and melt flow rate (MFR), the formulations containing the low IV PPO® SA120, Examples 8, 9 and 10, have significantly better flow than the formulations made with the higher IV PPO®. Also, there is no loss in tensile properties or HDT values with loadings up to 5 wt %. In Example 10, there is a reduction in tensile strength and elongation, but the properties are sufficient for a variety of applications.

TABLE 3

|  | Control 4 | 7 | Comp 2 | 8 | Comp 3 | 9 | Comp 4 |
|---|---|---|---|---|---|---|---|
| Component |  |  |  |  |  |  |  |
| ULTEM ® 1010 (wt %) | 80 | 77 | 77 | 75 | 75 | 73 | 73 |
| PPO ® SA120, 0.12 IV (wt %) |  | 3 |  | 5 |  | 7 |  |
| PPO ® 646 0.46 IV (wt %) |  |  | 3 |  | 5 |  | 7 |
| Glass (wt %) | 20 | 20 | 20 | 20 | 20 | 20 | 20 |
| Properties |  |  |  |  |  |  |  |
| Capillary MV, 337° C. @ 5120 s$^{-1}$ (Pa-s) | 245 | 186 | 233 | 127 | 222 | 86 | 215 |
| MFR 337° C./6.6 kg (cc/10 min) | 13.5 | 14.4 | 12.4 | 16.6 | 12.6 | 23.3 | 12.7 |
| Tensile Modulus (Kpsi) | 926 | 950 | 1024 | 1110 | 1010 | 1224 | 1006 |
| Tensile Yield Stress (Kpsi) | 21 | 21 | 21.4 | 19.1 | 20.6 | 12.8 | 19.7 |
| Tensile Elongation (%) | 3.6 | 3 | 3 | 2.2 | 3 | 1.4 | 2.9 |
| HDT (° C.) | 209 | 209 | 210 | 208 | 210 | 208 | 210 |
| UL 94, V-0 Thickness (mils) | 16 | 16 |  | 16 |  | 16 |  |

TABLE 4: Control 5 and Examples 10–12

Polyetherimide formulations containing 30 parts chopped glass fibers with 0, 1, 3, and 5 parts, respectively, of low IV PPO® SA120 were compounded and molded at 380° C. using similar procedures outlined in Table 1. The glass fibers were side fed into the 28 mm WP extruder. Data from Examples 10–12 show an improvement in flow without a significant loss in mechanical or impact performance when compared to Control 5.

TABLE 4

|  | Units | Control 5 | 10 | 11 | 12 |
|---|---|---|---|---|---|
| Component |  |  |  |  |  |
| ULTEM ® 1010 | wt % | 70 | 69 | 67 | 65 |
| PPO ® SA120, 0.12 IV | wt % | — | 1 | 3 | 5 |
| Glass | wt % | 30 | 30 | 30 | 30 |
| Properties |  |  |  |  |  |
| MVR, 360° C./5 kg | cc/10 min | 15.8 | 16.9 | 20.3 | 20.3 |
| Tensile Modulus | MPa | 9533 | 9518 | 9366 | 9754 |
| Tensile Yield Stress | MPa | 162 | 161 | 154 | 149 |
| Tensile Elongation | % | 3.2 | 3.2 | 2.8 | 2.4 |
| Izod Unnotched Impact | kJ/m$^2$ | 43 | 42 | 39 | 38 |

TABLE 5: Control 6, Comparative Example 5 and Example 13

Polyetherimide formulations containing 30 parts chopped glass fibers with 21 parts of either 0.48 IV PPO (Comp 5) or low IV PPO® SA120 (Example 13) were compounded and molded according to the procedures 10 outlined in Table 1 & 4. Example 13, which contains the low IV PPO® SA120, flows significantly better than either the control or the formulation containing the higher IV PPO®. However, at high loadings, there is a decrease in the tensile, impact, and HDT performance but the properties are still suitable for certain applications.

TABLE 5

|  | Units | Control 6 | Comp 5 | 13 |
|---|---|---|---|---|
| Component |  |  |  |  |
| ULTEM ® 1010 | wt % | 70 | 49 | 49 |
| PPO ® 803, 0.48 IV | wt % | — | 21 | — |
| PPO ® SA120, 0.12 IV | wt % | — | — | 21 |
| Glass | wt % | 30 | 30 | 30 |
| Properties |  |  |  |  |
| MVR, 295° C./10 kg | cc/10 min | 0.5 | 2 | 23 |
| Tensile Modulus | Mpa | 10100 | 9400 | 8700 |
| Tensile Yield Stress | Mpa | 157 | 124 | 73 |
| Tensile Elongation | % | 3 | 2 | 1 |
| Izod Unnotched Impact | kJ/m$^2$ | 60 | 16 | 10 |
| Vicat-B | ° C. | 214 | 214 | 203 |

TABLE 6: Control 7 and Examples 14–16

In Tables 6–8, three polysulfones obtained from BP Amoco were studied: Udel® (polysulfone) grade P1700, RadelA® (polyethersulfone) grade A200, and RadelR® (polyphenylsulfone) grade R5000. Formulations were dry mixed and then melt compounded in a Werner and Pfleiderer 28 mm co-rotating twin screw extruder at temperatures corresponding to 360° C., 375° C., and 400° C. for blends with Udel, RadelA, and RadelR, respectively. The pelletized materials were dried overnight at 120° C. before injection molding into parts for mechanical testing. Injection molding was performed in a 30-ton Engel molding machine at melt temperatures of 340° C. and a mold temperature of 95° C. Room temperature notched Izod impact strength, and tensile yield strength were then measured.

Polysulfone formulations containing 0, 2, 5, and 10 parts of low IV PPO® SA120 were compounded and molded according to the procedures outlined above. As compared to Control 7, Examples 14–16 demonstrate that the addition of the low IV PPO® SA120 results in a significant improvement in melt flow without a significant reduction in either mechanical strength or impact properties.

TABLE 6

|  | Units | Control 7 | 14 | 15 | 16 |
|---|---|---|---|---|---|
| Component |  |  |  |  |  |
| Udel P1700 | wt % | 100 | 98 | 95 | 90 |
| PPO ® SA120, 0.12 IV | wt % | 0 | 2 | 5 | 10 |

TABLE 6-continued

|  | Units | Control 7 | 14 | 15 | 16 |
|---|---|---|---|---|---|
| Properties |  |  |  |  |  |
| Capillary Viscosity, 360° C. @ 1000 s−1 | Pa-s | 455 | 427 | 234 | 84 |
| Tensile Yield Strength | Kpsi | 10.2 | 10.3 | 10.4 | 10.6 |
| Notched Izod @ 23° C. | Ft-lb/in | 1.2 | 1.1 | 0.9 | 0.8 |

TABLE 7: Control 8 and Examples 17–19.

Polyethersulfone formulations containing 0, 2, 5, and 10 parts of low IV PPO® SA120 were compounded and molded using the procedures outlined for Table 6. As compared to Control 8, formulations containing low IV PPO have lower melt viscosities while maintaining their mechanical and impact properties.

TABLE 7

|  | Units | Control 8 | 17 | 18 | 19 |
|---|---|---|---|---|---|
| Component |  |  |  |  |  |
| Radel A, A200 | wt % | 100 | 98 | 95 | 90 |
| PPO ® SA120, 0.12 IV | wt % | 0 | 2 | 5 | 10 |
| Properties |  |  |  |  |  |
| Capillary Viscosity, 360° C. @ 1000 s$^{-1}$ | Pa-s | 322 | 204 | 90 | 38 |
| Tensile Yield Strength | Kpsi | 11.3 | 11.3 | 11.4 | — |
| Notched Izod @ 23° C. | Ft-lb/in | 1.7 | 1.3 | 0.9 | — |

TABLE 8: Control 9 and Examples 20 and 21

Formulations containing 0, 2, and 5 parts of low IV PPO® SA120 in polyphenylsulfone were compounded and molded using the procedures described in Table 6. As seen in Table 8, the addition of low IV PPO in the formulation reduces the melt viscosity while retaining the excellent tensile strength and impact properties of polyphenylsulfone.

TABLE 8

|  | Units | Control 9 | 20 | 21 |
|---|---|---|---|---|
| Component |  |  |  |  |
| Radel R, R5000 | wt % | 100 | 98 | 95 |
| PPO ® SA120, 0.12 IV | wt % | 0 | 2 | 5 |
| Properties |  |  |  |  |
| Capillary Viscosity, 360° C. @ 1000 s$^{-1}$ | Pa-s | 460 | 439 | 160 |
| Tensile Yield Strength | Kpsi | 11.1 | 10.7 | — |
| Notched Izod @ 23° C. | Ft-lb/in | 15.7 | 12.8 | — |

EXPERIMENTAL

The poly(imide) resins employed were ULTEM® 1000—1000 with a weight-average molecular weight of 63,000 g/mol, and ULTEM® 1010-1000 with a weight-average molecular weight of 53,000 g/mol, while the poly(arylene ether) resins employed were PPO® 803 with an intrinsic viscosity (IV) of 0.48 dl/g, PPO® 646 with an IV of 0.46 dl/g, and PPO® SA120 with an IV of 0.12 dl/g, all commercially available from G. E. Plastics, Pittsfield, Mass. PPO® SA120 is poly (2,6-dimethyl-1,4-phenylene) ether in a pelletized form with an average size of approximately ⅙ inches (3 mm) after recovery from a reaction solution with a vented extruder. Three polysulfones obtained from Amoco were studied: Udel® (polysulfone) grade P1700, Radel A® (polyethersulfone) grade A200, and Radel R® (polyphenylsulfone) grade R5000. The chopped glass fiber that was used is G-filament glass (⅛ inches) sized with silane coupling agent available from Owens Corning.

Melt volume rate (MVR) was determined according to ISO 1133, using a Zwick capillary rheometer at either 295° C. or 360° C. A Tinius Olsen capillary rheometer with a 6.6 kg load was used to determine the melt flow rate (MFR) according to ASTM 1238. Mechanical properties were determined according to ISO 527, ISO 180, ASTM 638, and ASTM 790 standards. Plate-plate melt viscosity (MV) was determined at 360° C. using a Rheometrics Dynamic Rheometer, while the capillary MV was performed at 337° C. with a Rheometrics Capillary Rheometer. Viscosity measurements on the formulations containing the various polysulfones were made by capillary rheometry using a Goettfert Rheograph model 2002 equipped with a 12 mm diameter piston and a 30/1 L/D capillary die operated at 360° C. The molecular weights of the ULTEM® resins were determined by gel permeation chromatography (GPC) using chloroform as a solvent. Intrinsic viscosity (IV) is measured in chloroform at 25° C. in units of deciliters/gram (dl/g). ISO 306 or ASTM 648 was used to measure deformation under load as a function of temperature of a thermoplastic part. The temperature at which the part deforms according to the ISO norm is defined as the Vicat temperature and is defined as the heat distortion temperature (HDT) under the ASTM standard, in ° C. Tests for flame retardancy were performed according to UL-94 protocol for a VO rating using 20 test bars of the polyphenylene ether formulations with the dimensions: 5 inches by 0.5 inches by 1.5 mm.

The compositions made in the above examples were tested for flammability using a flame retardant testing tool which provides a prediction of the likelihood that a particular UL standard, such as UL-94 will be passed. The UL-94 protocol calls for bar-shaped specimens of dimensions 5 inches (12.7 cm)×0.5 inches (1.3 cm) width×the desired normal thickness, UL-94 ratings being specified for a particular thickness. A flame having an inner cone of height 0.75 inches (1.9 cm) is applied to each specimen so that a distance of 0.375 inches (1.0 cm) separates the lower end of the specimen from base of the flame. The flame is held in that position for 10 seconds and then removed. A burn time is defined as the time required for the flame issuing from the specimen to disappear. If burning of the specimen ceases within 30 seconds, the flame is reapplied for an additional 10 seconds. The criteria for V-0, V-1, and V-2 ratings are listed below in Table 9.

TABLE 9

| Vertical Flame Class Requirements | | | |
|---|---|---|---|
|  | 94V-0 | 94V-1 | 94V-2 |
| Individual burn time (seconds) | ≦10 | ≦30 | ≦30 |
| Total burn time (seconds) (5 specimens) | ≦50 | ≦250 | ≦250 |
| Glowing time (seconds) (individual specimen) | ≦30 | ≦60 | ≦60 |
| Drip particles that ignite cotton | NO | NO | YES |

"≦" means less than or equal to.

For a V-0 rating, no individual burn times, from the first or second application may exceed 10 seconds. The total of the burn times for any five specimens may not exceed 50 seconds. Drip particles that ignite a piece of cotton gauze situated below the specimen are not allowed. The values listed in Table 3 represent the minimum thickness for all 20 samples passing the V-0 criteria.

Each of the tables represents a single experiment. For each example in a given table the compounding/molding/testing conditions were the same.

In each set of experiments, a reference lacking a poly (arylene ether) was included. Each set of data shows the improvement in flow as reflected by measurement of MVR, MFR, Plate—Plate NW, or capillary Mv upon addition of a low IV poly(arylene ether) (PPO® SA120) to the formulation.

The above examples demonstrate the improved melt flow of high performance thermoplastic polymers that have a poly(arylene ether) (for example, polyphenylene ether), component. No significant loss of molecular weight, tensile properties, heat resistance, or impact strength occurred with the addition of the polyphenylene ether.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A thermoplastic resin composition, comprising, based upon the total weight of the composition
   about 40 wt % to about 99.9 wt % of a high Tg amorphous thermoplastic polymer resin wherein the high Tg amorphous thermoplastic polymer resin is selected from the group consisting of poly (imide) polymers, poly(amide imide) polymers, poly(sulfone) polymers, poly(ether sulfone) polymers, poly(etherimide) polymers, and combinations of the foregoing high Tg amorphous thermoplastic polymer resins; and about 0.1 wt % to about 50 wt % of an unfunctionalized poly(arylene ether) having an intrinsic viscosity of about 0.10 to about 0.15 dl/g, as measured in chloroform at 25° C.

2. A thermoplastic resin composition as in claim 1, comprising about 50 wt % to about 99 wt % of the high Tg amorphous thermoplastic polymer resin and about 1.0 wt % to about 40 wt % of the poly(arylene ether).

3. A thermoplastic resin composition as in claim 2, comprising about 70 wt % to about 95 wt % of the high Tg amorphous thermoplastic polymer resin and about 5 wt % to about 30 wt % of the poly(arylene ether).

4. A thermoplastic resin composition as in claim 1, wherein the poly(arylene ether) comprises a plurality of structural units of the formula XII):

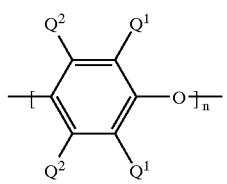

(XII)

wherein each $Q^1$ is independently a halogen, primary or secondary lower alkyl, phenyl, haloalkyl, aminoalkyl, hydrocarbonoxy, or halohydrocarbonoxy wherein at least two carbon atoms separate the halogen and oxygen atoms;
each $Q^2$ is independently a hydrogen, halogen, primary or secondary lower alkyl, having from one to four carbon atoms, phenyl, haloalkyl, hydrocarbonoxy or halohydrocarbonoxy wherein at least two carbon atoms separate the halogen and oxygen atoms; and
n is less than 50.

5. A thermoplastic resin composition as in claim 4, wherein n is less than about 40.

6. A thermoplastic resin composition as in claim 5, wherein n is about 10 to about 25.

7. A thermoplastic resin composition as in claim 4, wherein each $Q^1$ is $C_{1-4}$ alkyl or phenyl, and $Q^2$ is hydrogen.

8. A thermoplastic resin composition as in claim 7, wherein the poly(arylene ether) is a poly(2,6-dimethyl-1,4-phenyleneoxide).

9. A thermoplastic resin composition as in claim 4, wherein the poly(arylene ether) is a homopolymer comprising 2,6-dimethylphenylene ether units, copolymers comprising 2,6-dimethylphenylene ether and 2,3,6-trimethyl-1,4-phenylene ether units, or copolymers derived from copolymerization of 2,6-dimethylphenol with 2,3,6-trimethyl phenol.

10. A thermoplastic resin composition as in claim 1, wherein the poly(imide) comprises the structural units of the formula (I):

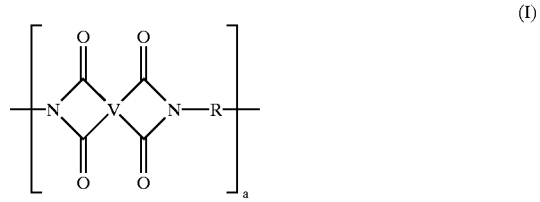

(I)

wherein
a is more than 1;
V is a tetravalent linker selected from the group consisting of (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms, and (c) combinations thereof, wherein the substitutions are ethers, epoxides, amides, esters, or combinations comprising at least one of the foregoing tetravalent linkers; and
R is a divalent organic radical selected from the group consisting of (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the formula (IV):

(IV)

wherein Q is a divalent moiety selected from the group consisting of —O—, —S—, —C(O)—, —SO$_2$, $C_yH_{2y-2}$— and halogenated derivatives thereof, wherein y is an integer from 1 to 10.

11. A thermoplastic resin composition as in claim 10, wherein a is about 10 to about 1000.

12. A thermoplastic resin composition as in claim 10, wherein a is about 10 to about 500.

13. A thermoplastic resin composition as in claim 10, wherein V is selected from the group consisting of the tetravalent aromatic radicals of formula (II):

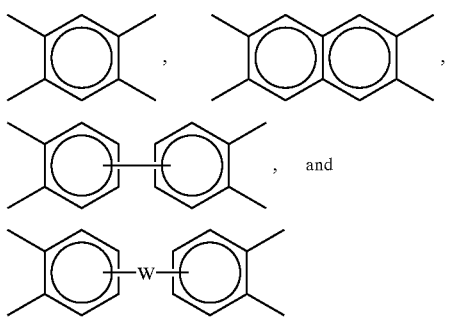
(II)

and halogenated derivatives of tetravalent aromatic radicals of formula (II), wherein W is a divalent moiety selected from the group consisting of —O—, —S—, —C(O)—, —SO$_2$—, C$_y$H$_{2y}$, C$_y$H$_{2y-2}$—, and halogenated derivatives thereof, wherein y is an integer from 1 to 10, and a group of the formula —O—Z—O— wherein the divalent bonds of the —O— or the —O—Z—O— group are in the 3,3', 3,4', 4,3', or the 4,4' positions, and wherein Z is selected from the group consisting of divalent radicals of formula (III):

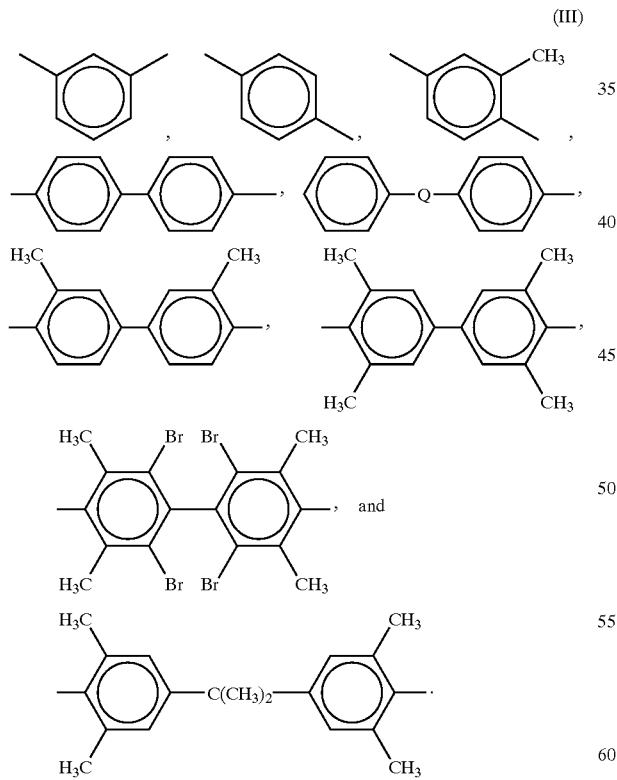
(III)

14. A thermoplastic resin composition as in claim 1, wherein the poly(etherimide) polymer comprises structural units of the formula (V):

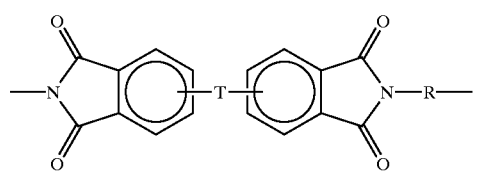
(V)

wherein T is —O— or a group of the formula —O—Z—O— wherein the divalent bonds of the —O— or the —O—Z—O— group are in the 3,3', 3,4', 4,3', or the 4,4' positions; and wherein Z is one or more of the divalent radicals of formula (III):

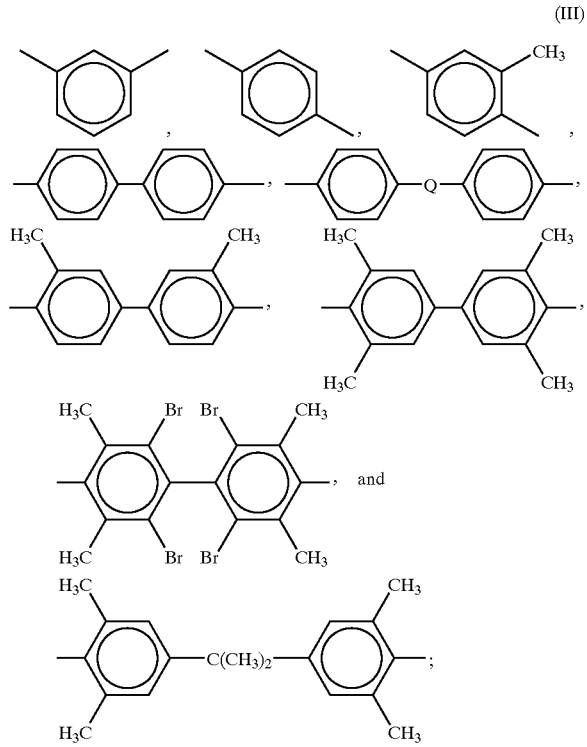
(III)

and

R is a divalent organic radical selected from the group consisting of (a) aromatic hydrocarbon radicals having about 6 to about 20 carbon atoms or halogenated derivatives thereof (b) straight or branched chain alkylene radicals having about 2 to about 20 carbon atoms; (c) cycloalicylene radicals having about 3 to about 20 carbon atoms, and (d) divalent radicals of the formula (IV):

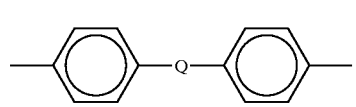
(IV)

wherein Q is a divalent moiety selected from the group consisting of —O—, —S—, —C(O)—, —SO$_2$—, C$_y$H$_{2y}$—, C$_y$H$_{2y-2}$—, and halogenated derivatives thereof, wherein y is an integer from 1 to 10.

15. A thermoplastic resin composition as in claim 14, wherein the poly(etherimide) further comprises the polyimide structural units of the formula (VI):

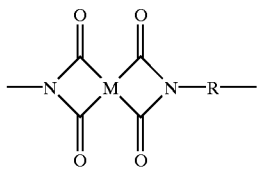
(VI)

wherein R is a substituted or unsubstituted divalent organic radical selected from the group consisting of (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the general formula (IV):

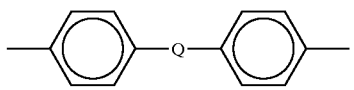
(IV)

wherein Q is a divalent moiety selected from the group consisting of —O—, —S—, —C(O)—, —SO$_2$—, C$_y$H$_{2y}$—, C$_y$H$_{2y-2}$—, and halogenated derivatives thereof, wherein y is an integer from 1 to 5; and wherein M is one or more of the radicals of formula (VII):

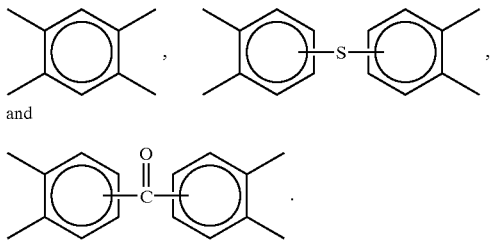
(VII)

16. A thermoplastic resin composition as in claim 14, wherein the R is independently p-phenylene, m-phenylene, or a mixture comprising at least one of the foregoing Rs and T is a divalent radical of the formula (XI):

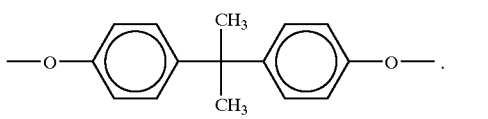
(XI)

17. A thermoplastic rosin composition as in claim 1, wherein the poly(imide) is prepared by reaction of a first material selected from the group consisting of 2,2-bis[4-(3,4-dicarboxyphenoxy)phenyl]propane dianhydride, 4,4'-bis(3,4-dicarboxyphenoxy)diphenyl ether dianhydride, 4,4'-bis(3,4-dicarboxyphenoxy)diphenyl sulfide dianhydride, 4,4'-bis(3,4-dicarboxyphenoxy)benzophenone dianhydride, 4,4'-bis(3,4-dicarboxyphenoxy)diphenyl sulfone dianhydride, 2,2-bis[4-(2,3-dicarboxyphenoxy)phenyl]propane dianhydride, 4,4'-bis(2,3-dicarboxyphenoxy)diphenyl ether dianhydride, 4,4'-bis(2,3-dicarboxyphenoxy)diphenyl sulfide dianhydride, 4,4'-bis(2,3-dicarboxyphenoxy)benzophenone dianhydride, 4,4'-bis(2,3-dicarboxyphenoxy)diphenyl sulfone dianhydride, 4-(2,3-dicarboxyphenoxy)-4'-(3,4-dicarboxyphenoxy)diphenyl-2,2-propane dianhydride, 4-(2,3-dicarboxyphenoxy)-4'-(3,4-dicarboxyphenoxy)diphenyl ether dianhydride, 4-(2,3-dicarboxyphenoxy)-4'-(3,4-dicarboxyphenoxy)diphenyl sulfide dianhydride, 4-(23-dicarboxyphenoxy)-4'-(3,4-dicarboxyphenoxy)benzophenone dianhydride, 4-(2,3-dicarboxyphenoxy)-4'-(3,4-dicarboxyphenoxy)diphenyl sulfone dianhydride, and mixtures comprising at least one of the foregoing first materials, with a second material selected from the group consisting of ethylenediamine, propylenediamine, trimethylenediamine, diethylenetriamine, triethylenetetramine, hexamethylenediarmne, heptamethylenediamine, octamethylenediarnine, nonamethylenediamine, decamethylenediamine, 1,12-dodecanediamine, 1,18-octadecanediamine, 3-methylheotamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1.4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethyiphenyl) methane, bis(4-aminophenyl) propane, 2,4-bis(b-amino-t-butyl) toluene, bis(p-b-ammo-t-butylphenyl) ether, bis(p-b-methyl-o-aminophenyl) benzene, bis(p-b-methyl-o-aminopentyl) benzene, ., 3-diamino-4-isopropylbenzene, bis(4-aminophenyl) sulfide, bis (4-aminophenyl) sulfone, bis(4-aminophenyl) ether, 1,3-bis (3-aminopropyl) tetramethyldisiloxane, and mixtures comprising at least one of the foregoing second materials.

18. A thermoplastic resin composition as in claim 17, wherein the poly(etherimide) is prepared by reaction of aromatic dianhydrides selected from the group consisting of pyromellitic dianhydride, 2,2-bis[4-(3,4-dicarboxyphenoxy)phenyl]propane dianhydride, and mixtures comprising at least one of the foregoing dianhydrides, with diamines selected from the group consisting of aliphatic diamines, hexamethylenediamine, 1,3-bis(3-aminopropyl) tetramethyldisiloxane, m-phenylenediamine, p-phenylenediamine, or mixtures comprising at least one of the foregoing diamines.

19. A thermoplastic resin composition as in claim 1, wherein the high Tg amorphous thermoplastic polymer has a Tg of about 170° C or greater.

20. A thermoplastic resin composition as in claim 19, wherein the high Tg amorphous thermoplastic polymer has a Tg of about 200° C. or greater.

21. A thermoplastic resin composition as in claim 1, wherein the poly(arylene ether) was recovered from a reaction solution as a solid mass and granulated or pelletized to a desired size or is recovered from a reaction solution as an agglomerate with an average particle size greater than 100 μm.

22. A thermoplastic resin composition as in claim 1, wherein the poly(arylene ether) was recovered from a reaction solution of the poly(arylene ether) as a solid mass by evaporating solvent from said reaction solution in a film evaporator, cooling the recovered poly(arylene ether) to form a solid and granulating or pelletizing the solid.

23. A thermoplastic resin composition as in claim 1, wherein the poly(arylene ether) is recovered from a reaction solution of the poly(arylene ether) as a solid mass by evaporating solvent from said reaction solution with a vented extruder and extruding the poly(arylene ether), cooling the extruded poly(arylene ether) to from a solid and granulating or pelletizing the solid.

24. A thermoplastic resin composition comprising, based upon the total weight of the composition, about 0.1 wt % to about 50 wt % of an unfunctionalized poly(arylene ether) having an intrinsic viscosity of about 0.10 to about 0.15 dug, as measured in chloroform at 25° C, wherein the poly (arylene ether) polymer comprises a plurality of structural units of the formula (XII):

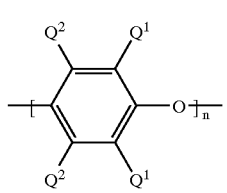
(XII)

wherein each $Q^1$ is independently a halogen, primary or secondary lower alkyl having from one to four carbon atoms, phenyl, haloalkyl, aminoalkyl, hydrocarbonoxy, or halohydrocarbonoxy wherein at least two carbon atoms separate the halogen and oxygen atoms; each $Q^2$ is independently a hydrogen, halogen, primary or secondary lower alkyl, phenyl, haloalkyl, hydrocarbonoxy or halohydracarbonoxy wherein at least two carbon atoms separate the halogen and oxygen atoms; and n is less than 50; and about 40 wt % to about 99.9 wt % of a high Tg amorphous thermoplastic polymer resin, wherein the high Tg amorphous thermoplastic polymer resin comprises structural units of the formula (V):

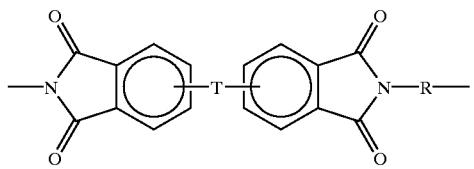
(V)

wherein T is —O— or a group of the formula —O—Z—O— wherein the divalent bonds of the —O— or the —O—Z—O— group are in the 3,3', 3,4', 4,3', or the 4,4'positions; and wherein Z is one or more of the divalent radicals of formula (III):

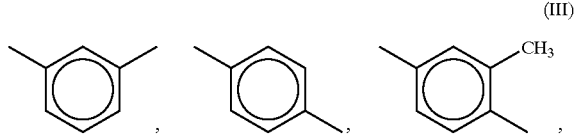
(III)

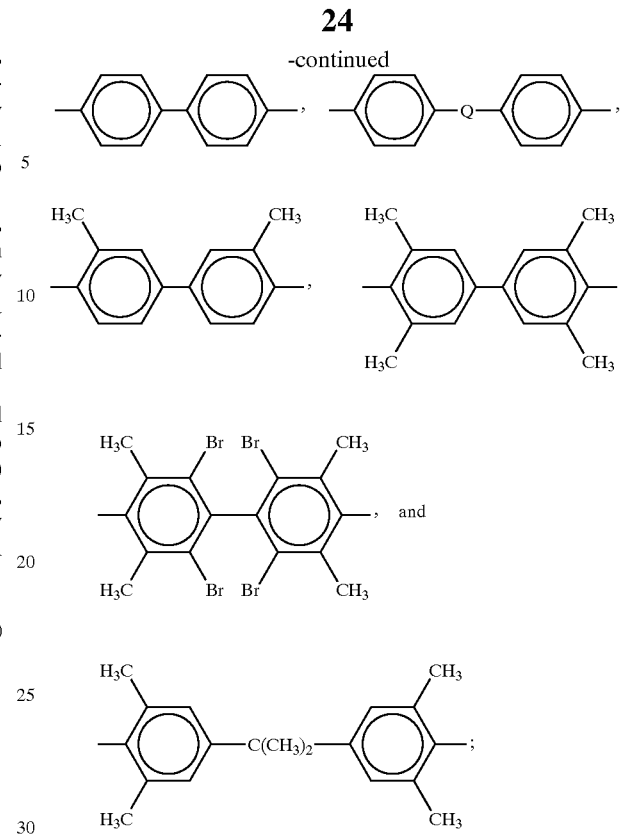

and

R is a divalent organic radical selected from the group consisting of (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the formula (IV):

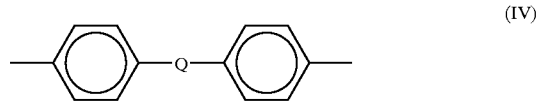
(IV)

wherein Q is a divalent moiety selected from the group consisting of —O—, —S—, —C(O)—, —SO$_2$—, C$_y$H$_{2y}$—, C$_y$H$_{2y-2}$—, and halogenated derivatives thereof wherein y is an integer from 1 to 10.

25. A thermoplastic resin composition as in claim 24, comprising about 50 wt % to about 99 wt % of the high Tg amorphous thermoplastic polymer resin and about 1 wt % to about 40 wt % of the poly(arylene ether).

26. A thermoplastic resin composition as in claim 25, comprising about 70 wt % to about 95 wt % of the high Tg amorphous thermoplastic polymer resin and about 5 wt % to about 30 wt % of the poly(arylene ether).

27. A thermoplastic resin composition as in claim 24, wherein each $Q^1$ is $C_{1-4}$ alkyl or phenyl, and $Q^2$ is hydrogen.

28. A thermoplastic resin composition as in claim 24, wherein the high Tg amorphous thermoplastic resin further comprises poly(imide) structural units of the formula (VI):

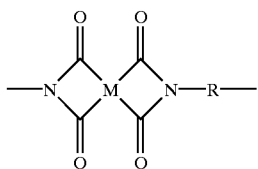

(VI)

wherein R is a substituted or unsubstituted divalent organic radical selected from the group consisting of (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the general formula (IV):

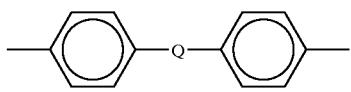

(IV)

wherein Q is a divalent moiety selected from the group consisting of —O—, —S—, —C(O)—, —SO$_2$—, $C_yH_{2y}$—, $C_yH_{2y-2}$—, and halogenated derivatives thereof, wherein y is an integer from 1 to 10; and M is one or more of the radicals of formula (VII):

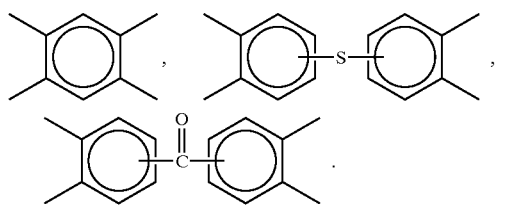

(VII)

, and

29. A thermoplastic resin composition as in claim 24, wherein the high Tg amorphous thermoplastic polymers are prepared by reaction of a first material selected from the group consisting of 2,2-bis[4-(3,4-dicarboxyphenoxy) phenyl]propane dianhydride, 4,4'-bis(3,4-dicarboxyphenoxy)diphenyl ether dianhydride, 4,4'-bis(3,4-dicarboxyphenoxy)diphenyl sulfide dianhydride, 4,4'-bis(3,4-dicarboxyphenoxy)benzophenone dianhydride, 4,4'-bis(3,4-dicarboxyphenoxy)diphenyl sulfone dianhydride, 2,2-bis[4-(2,3-dicarboxyphenoxy)phenyl]propane dianhydride, 4,4'-bis(2,3-dicarboxyphenoxy)diphenyl ether dianhydride, 4,4'-bis(2,3-dicarboxyphenoxy)diphenyl sulfide dianhydride, 4,4-bis(2,3-dicarboxyphenoxy)benzophenone dianhydride, 4,4'-bis(2,3-dicarboxyphenoxy)diphenyl sulfone dianhydride, 4-(2,3-dicarboxyphenoxy)-4'-(3,4-dicarboxyphenoxy)diphenyl-2,2-propane dianhydride, 4-(2,3-dicarboxyphenoxy)-4'-(3,4-dicarboxyphenoxy)diphenyl ether dianhydride, 4-(2,3-dicarboxyphenoxy)-4'-(3,4-dicarboxyphenoxy)diphenyl sulfide dianhydride, 4-(2,3-dicarboxyphenoxy)-4'-(3,4-dicarboxyphenoxy) benzophenone dianhydride, 4-(2,3-dicarboxyphenoxy)-4'-(3,4-dicarboxyphenoxy)diphenyl sulfone dianhydride, and mixtures comprising at least one of the foregoing first materials, with a second material selected from the group consisting of ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis(p-b-amino-t-butylphenyl) ether, bis(p-b-methyl-o-aminophenyl) benzene, bis(p-b-methyl-o-aminopentyl) benzene, 1,3-diamino-4-isopropylbenzene, bis(4-aminophenyl) sulfide, bis (4-aminophenyl) sulfone, bis(4-aminophenyl) ether, 1,3-bis (3-aminopropyl) tetramethyldisiloxane, and mixtures comprising at least one of the foregoing second materials.

30. A thermoplastic resin composition as in claim 29, wherein the high Tg amorphous thermoplastic polymers are prepared by reaction of aromatic dianhydrides selected from the group consisting of pyromellitic dianhydride, 2,2-bis[4-(3,4-dicarboxyphenoxy)phenyl]propane dianhydride, and mixtures comprising at least one of the foregoing dianhydrides, with diamines selected from the group consisting of aliphatic diamines, hexamethylenediamine, 1,3-bis(3-aminopropyl) tetramethyldisiloxane, m-phenylenediamine, p-phenylenediamine, or mixtures comprising at least one of the foregoing diamines.

31. A method of preparing a thermoplastic resin composition comprising:
melt mixing about 40 wt % to about 99.9 wt % of a high Tg amorphous thermoplastic polymer resin selected from the group consisting of poly (imide) polymers, poly(sulfone) polymers, and combinations of the foregoing high Tg amorphous thermoplastic polymer resins and about 0.1 wt % to about 50 wt % of an unfunctionalized poly(arylene ether) having an intrinsic viscosity/of about 0.10 to about 0.15 dl/g, as measured in chloroform at 25° C., to form a mixture; and molding the mixture.

32. A thermoplastic resin composition, comprising the reaction product of, based upon the total weight of the composition:
about 40 wt % to about 99.9 wt % of a high Tg amorphous thermoplastic polymer resin selected from the group consisting of poly (imide) polymers, poly(sulfone) polymers, and combinations of the foregoing high Tg amorphous thermoplastic polymer resins; and about 0.1 wt % to about 50 wt % of an unfunctionalized poly (arylene ether) having an intrinsic viscosity of about 0.10 to about 0.15 dl/g, as measured in chloroform at 25° C.

33. A thermoplastic resin composition as in claim 32, wherein the poly(arylene ether) was recovered from a reaction solution as a solid mass and granulated or pelletized to a desired size or is recovered from a reaction solution as an agglomerate with an average particle size greater than 10 µm.

34. A thermoplastic resin composition as in claim 32, wherein the poly(arylene ether) was recovered from a reaction solution of the poly(arylene ether) as a solid mass by evaporating solvent from said reaction solution in a film evaporator, cooling the recovered poly(arylene ether) to form a solid and granulating or pelletizing the solid.

35. A thermoplastic resin composition as in claim 32, wherein the poly(arylene ether) is recovered from a reaction solution of the poly(arylene ether) as a solid mass by evaporating solvent from said reaction solution with a vented extruder and extruding the poly(arylene ether), cooling the extruded poly(arylene ether) to from a solid and granulating or pelletizing the solid.

\* \* \* \* \*